United States Patent [19]

Strand

[11] Patent Number: 4,972,880
[45] Date of Patent: Nov. 27, 1990

[54] PIPE LINER

[75] Inventor: Norman S. Strand, Midland, Mich.

[73] Assignee: Insta-Pipe Research Limited Partnership, Warren, Mich.

[21] Appl. No.: 235,058

[22] Filed: Aug. 23, 1988

Related U.S. Application Data

[62] Division of Ser. No. 61,584, Jun. 15, 1987, Pat. No. 4,768,562.

[51] Int. Cl.$^5$ ............................................. F16L 11/00
[52] U.S. Cl. ..................... 138/98; 138/103; 138/124; 138/177; 138/178; 428/34.9; 428/913; 174/DIG. 8
[58] Field of Search ................... 138/97, 98, 103, 110, 138/123, 124, 125, 126, 127, 137, 177, 178; 174/DIG. 8; 156/83, 275.5; 428/34.1, 35.7, 36.1, 913, 36.9, 36.91, 34.9; 29/446, 448, 523

[56] References Cited

U.S. PATENT DOCUMENTS

| | | | |
|---|---|---|---|
| 3,473,087 | 10/1969 | Slade | 138/103 |
| 3,555,170 | 1/1971 | Petzetakes | 138/103 |
| 4,009,063 | 2/1977 | Wood | 138/97 |
| 4,059,847 | 11/1977 | Phillips et al. | 138/103 |
| 4,092,193 | 5/1978 | Brooks | 138/98 |
| 4,207,364 | 6/1980 | Nyberg | 138/140 |
| 4,361,451 | 11/1982 | Rensud | 138/97 |
| 4,386,629 | 6/1983 | Cook et al. | 138/98 |
| 4,413,019 | 11/1983 | Brenner | 156/275.5 |
| 4,471,087 | 5/1988 | Plummer | 29/446 |
| 4,723,579 | 2/1988 | Hyodo et al. | 138/98 |
| 4,789,007 | 12/1988 | Cretel | 138/127 |

FOREIGN PATENT DOCUMENTS

| | | | |
|---|---|---|---|
| 3513956 | 10/1986 | Fed. Rep. of Germany | 138/98 |
| 106923 | 8/1979 | Japan | 138/98 |
| 106924 | 8/1979 | Japan | 138/98 |

Primary Examiner—James E. Bryant, III
Attorney, Agent, or Firm—Gifford, Groh, Sprinkle, Patmore and Anderson

[57] ABSTRACT

A pipe liner for insertion into a pipe to be relined which includes an elastomeric tube encompassed by a lattice of fibre material which radially contracts upon elongation and which is impregnated with a resin that is partially polymerized when the lattice is in its elongated and radially contracted condition to maintain the combination in that condition until has been inserted into a pipe at which the time the liner is softened upon additional polymerization to permit expansion of the liner into contact with the damaged pipe to be lined.

8 Claims, 1 Drawing Sheet

PIPE LINER

This is a divisional of co-pending application Ser. No. 061,584 filed on June 15, 1987, now U.S. Pat. No. 4,768,562 issued Sept. 6, 1988.

BACKGROUND OF THE INVENTION

The invention relates to the rehabilitation of deteriorated underground piping.

The prior art teaches several methods of sewer or pipeline rehabilitation, ranging from the excavation and replacement of the damaged pipe section to slip lining, i.e., the insertion of a second pipe of smaller diameter through the existing piping. However, excavation is costly, time consuming, and particularly impractical in congested urban areas, while the smaller pipe employed in slip lining appreciably reduces pipeline capacity.

A recent development in the art teaches a method of insitu pipe repair comprising the insertion therein of a pliable polyester felt sleeve whose inner surface is impregnated with a thermoset resin. The sleeve is inverted as it is advanced through the damaged pipe under hydrostatic pressure. The sleeve is thus turned inside-out, with its resin-impregnated inner surface pressing firmly against the inner walls of the damaged pipe. The water is then heated and recirculated for several hours, whereby the thermoset resin cures to form a new pipe within the original pipe.

Unfortunately, the inverted thermoset sleeve method necessitates procurement and subsequent heating . of prodigious quantities of water. A prolonged curing period is also required, during which the pipeline must be removed from service. Further, the inversion technique is suitable for use with a limited range of pipe diameters and cannot accommodate more substantial and, hence, more rigid reinforcement fibres within the thermoset resin matrix.

SUMMARY OF THE INVENTION

The pipe liner of the instant invention comprises an elastomeric tube having an outer diameter substantially equal to the inner diameter of the damaged pipe and encompassed by an electrically conductive resinated fibre lattice of woven material that radially contracts when axially elongated. The elastomeric tube and resinated fibre lattice are axially tensioned, whereby the maximum diameter of the liner is elastically reduced by the resultant elongation thereof. The resin is partially polymerized, whereafter the liner is substantially maintained in such axially elongated, reduced diameter condition by the resinated fibre lattice while remaining sufficiently flexible to permit the coiling thereof for storage and transportation, and to facilitate installation of the liner within the damaged pipe.

The elongated, reduced diameter liner is pulled through the section of damaged pipe to be rehabilitated, whereafter an electrical current is directed through the resinated fibre lattice therein. The partially polymerized resin is thus softened by electrical resistance heating. The elastomeric tube, no longer restrained by the resinated fibre lattice, resiliently expands radially outwardly, forcing the resinated fibre lattice into firm contact with the inner wall of the damaged pipe. The liner is further heated electrically so as to completely polymerize the resin, thereby bonding the liner to the inner wall of the damaged pipe and effecting repair thereof.

Where the inner wall of the damaged pipe is particularly rough or uneven, or where lubrication is deemed necessary to facilitate movement of the elongated liner therethrough, the outer surface of the fibre lattice is electrostatically flocked with short fibres prior to the impregnation thereof with the polymerizable resin, whereby the short fibres protrude radially outwardly from the resinated fibre lattice. The flocking serves to wick the resin from the fibre lattice to the inner wall of the damaged pipe upon contact therewith. The flocking additionally facilitates liner movement and installation by providing a slippery surface thereupon.

DETAILED DESCRIPTION OF THE PREFERRED EMBODIMENT OF THE INVENTION

Figure 1:
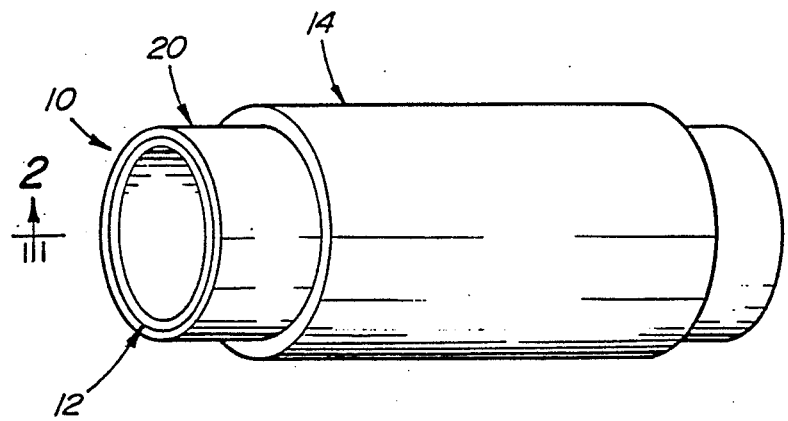
FIG. 1 is a view in perspective of a section of damaged pipe lined with the pipe liner of the instant invention.
Figure 2:
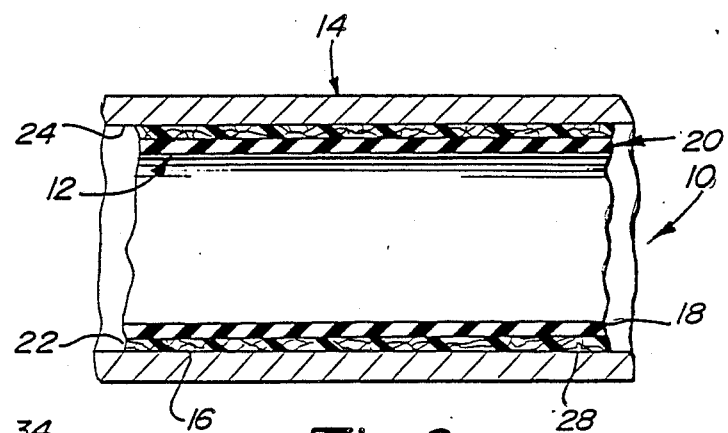
FIG. 2 is a partial longitudinal section of the lined pipe along line 2—2 of FIG. 1.

Referring to FIGS. 1 and 2, a pipe liner 10 constructed in accordance with the instant invention comprises an elastomeric tube 12 of conventional construction having an outer diameter substantially equal to the nominal inner diameter of the section of damaged pipe 14 to be rehabilitated; a reinforcement fibre lattice 16 which encompasses the tube 12 and is formed so as to radially contract when axially elongated; and a polymerizable resin 18, such as a thermoplastic or thermoset resin, which impregnates the fibre lattice 16. It is to be noted that the resultant resinated or resin impregnated fibre lattice 20 is to be electrically conductive and, hence, comprises reinforcement fibres 22 formed of, or coated with, an electrically conductive material; or a polymerizable resin 18 formed of, or impregnated with, an electrically conductive material. For example, the electrically conductive resinated fibre lattice 20 may comprise a mixture of metallic fibres 32 and electrically non-conductive fibres 34 all impregnated with an electrically non-conductive thermoset resin as seen in FIGS. 3 and 4.

Figure 3:
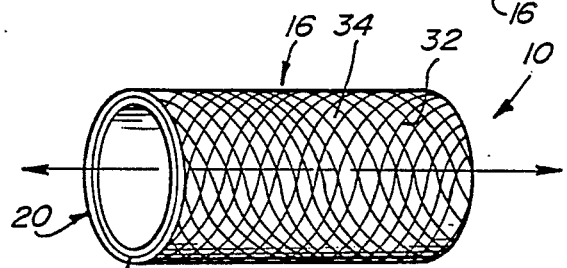
FIG. 3 is a view in perspective of a section of pipe liner prior to axial elongation and partial polymerization of the resin thereof.
Figure 4:
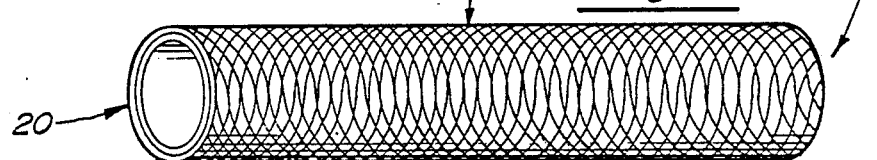
FIG. 4 is a view in perspective of the liner section of FIG. 3 being maintained in axial elongation by the partially polymerized resin thereof.
Figure 5:
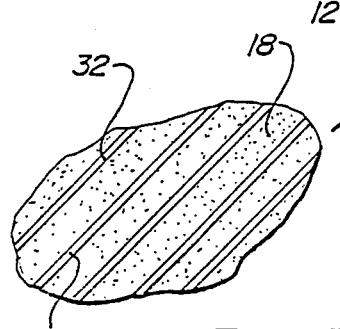
FIG. 5 is an enlarged view of a portion of the outer surface of the liner.

The tube 12 and resinated fibre lattice 20 are then axially tensioned, whereby the maximum diameter of the tube 12 and lattice 20 are elastically reduced as both tube 12 and lattice 20 are axially elongated, from the condition in FIG. 3 to the condition in FIG. 4. While the elongated radially reduced lattice is maintained in its FIG. 4 condition, the resin 18 of the resinated fibre lattice 20 is partially polymerized by heating or irradiation, whereafter the liner 10 is substantially maintained in such axially elongated, reduced diameter condition by the partially polymerized resin.

It is to be noted that the resin 18 is polymerized only to the extent necessary to give the lattice 20 sufficient strength to counter the resilience of the elastomeric tube 12. For example, where the elastomeric tube 12 is formed of neoprene having a hardness of 90 Shore A, and the resinated fibre lattice 20 includes metallized fibres such as indicated at 32 and impregnated or coated with a thermoset resin, the thermoset resin is B-staged to a hardness of approximately 20 Shore D. Thus, the partially polymerized resinated fibre lattice 20, and, hence, the elongated liner 10, remains sufficiently flexible to permit the coiling of the liner 10 for storage and transportation, and to facilitate installation of the liner 10 within the damaged pipe section 14.

Figure 6:
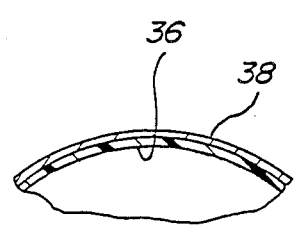
FIG. 6 is a cross-sectional view of one of the fibres in the outer surface of the liner.
Figure 7:
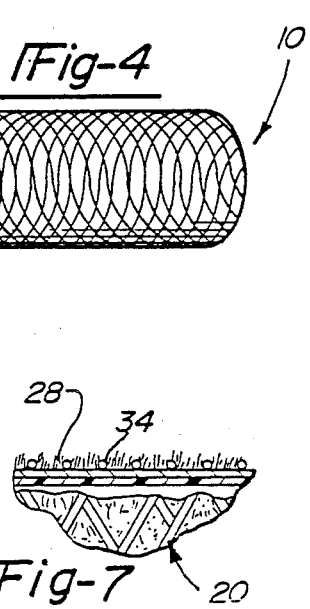
FIG. 7 is a cross-sectional view of a portion of the liner showing a modified form of the invention.

The use of fibres having a non-conductive core 36 and a metallic coating 38 of electrically conductive material as shown in FIG. 6 also is contemplated for construction of the electrically conductive resin impregnated lattice.

The axially elongated, reduced diameter liner 10 is inserted into position within the damaged pipe section 14, whereafter an electrical current is directed through the electrically conductive resin impregnated or resinated fibre lattice 20. The resin 18 therein softens by electrical resistance heating, and the elastomeric tube 12, no longer restrained by the resinated fibre lattice 20, resiliently expands radially outwardly, forcing the resinated fibre lattice 20 into firm contact with the inner wall 24 of the damaged pipe section 14, as shown in FIG. 2. The liner 10 is further heated electrically so as to fully polymerize the resin 18, thereby bonding the liner 10 to the inner wall 24 of the damaged pipe section 14. The damaged pipe section 14 is thus concentrically lined with both the fully polymerized resinated fibre lattice 20 and the elastomeric tube 12. It is to be noted that the bonding of the lattice 20 to the inner wall 24 of the damaged pipe section 14 significantly increases the structural integrity of the rehabilitated pipe section.

As mentioned, the electrically conductive resin impregnated lattice 20 can be made electrically conductive by using electrically conductive fibres as indicated 32 in FIGS. 3 and 4 or by using fibres such as shown in FIG. 6. If non-conductive fibres form the lattice 16 the resin itself may be electrically conductive.

Where the inner wall 24 of the damaged pipe section 14 is particularly rough or uneven, the outer surface 26 of the fibre lattice 16 is electrostatically flocked with short fibres 28, as shown in FIG. 2, thereby enabling the lattice 16 to be impregnated with a greater amount of polymerizable resin 18. Moreover, where the fibres 28 are permitted to protrude radially outwardly from the resinated fibre lattice 20, the protruding fibres 28 serve to wick the resin 18 from the resinated fibre lattice 20 to the inner wall 24 of the damaged pipe section 14 upon contact of the fibres 28 therewith. A more effective bond between the resinated fibre lattice 20 and the pipe's inner wall 24 is thus generated, particularly where the inner wall 24 is rough or uneven.

Additionally, since the protruding fibres 28 tend to bend during movement of the elongated liner 10, the bent fibres 28 effectively act as a lubricant to facilitate installation of the elongated liner 10 by generating an essentially slippery surface thereupon.

It is to be noted that, although the electrical resistance heating of an electrically conductive resinated fibre lattice 20 is utilized herein to effect softening and complete polymerization of the resin 18 therein subsequent to the insertion of the elongated liner 10 into the damaged pipe section 14, the instant invention contemplates the use of other polymerization means, including irradiation and other heating methods, as may be required by the particular resin employed therein.

While the preferred embodiment of the invention has been disclosed, it should be appreciated that the invention is susceptible of modification without departing from the spirit of the invention or the scope of the subjoined claims.

I claim:

1. A liner for insertion into an existing pipe section having an inner surface of nominal diameter comprising:
   an elastomeric tube having an outer diameter substantially equal to the nominal inner diameter of said pipe section;
   a reinforcement lattice of woven fibre materials encompassing said elastomeric tube, said lattice being radially contracted and axially elongated; and
   a polymerizable resin impregnating said lattice, said resin being partially polymerized to maintain said lattice in said axially elongated and radially contracted condition, said resin impregnated lattice being radially expandable upon subsequent polymerization and softening of said resin from said partially polymerized condition to permit radial expansion of said resin impregnated lattice into contact with the inner wall of said pipe section for bonding of said lattice to said inner wall of said pipe section upon complete polymerization of said resin.

2. The liner of claim 1 wherein said partially polymerized resin can continue to polymerize upon application of heat to said lattice.

3. The liner of claim 2 wherein said lattice is electrically conductive for resistance heating of said partially polymerized resin.

4. The liner of claim 3 wherein said electrically conductive lattice includes metallic fibres.

5. The liner of claim 3 wherein said lattice includes reinforcement fibres having an electrically conductive metallic coating.

6. The liner of claim 3 wherein said lattice includes non-conductive fibres impregnated with an electrically conductive resin.

7. The liner of claim 1 including relatively short reinforcement fibres extending radially outwardly from said lattice, said short fibres being coated with said resin.

8. The liner of claim 7 wherein said relatively short fibres protrude from said resin impregnated lattice when said resin is in its partially polymerized state, said protruding fibres facilitating insertion of said liner into said damaged pipe section.

* * * * *